United States Patent [19]

Plunguian et al.

[11] 4,098,755

[45] Jul. 4, 1978

[54] SHAPED ARTICLES OF HYDRAULIC CEMENT COMPOSITIONS HAVING A REFLECTIVE SURFACE

[76] Inventors: Mark Plunguian, 6912 Columbia Dr.; Charles E. Cornwell, 7104 Marlan Dr., both of Alexandria, Va. 22307

[21] Appl. No.: 782,763

[22] Filed: Mar. 25, 1977

Related U.S. Application Data

[60] Division of Ser. No. 649,895, Jan. 16, 1976, Pat. No. 4,036,839, which is a continuation-in-part of Ser. No. 591,095, Jun. 27, 1975, Pat. No. 3,995,086.

[51] Int. Cl.$^2$ .......................... C04B 7/35; C04B 7/355
[52] U.S. Cl. .................................. 260/39 R; 106/90; 106/314
[58] Field of Search ................ 106/314, 90; 260/39 R

[56] References Cited

U.S. PATENT DOCUMENTS

| | | | |
|---|---|---|---|
| 3,686,133 | 8/1972 | Hattori et al. | 106/314 X |
| 3,965,233 | 6/1976 | Ritter | 264/338 X |
| 3,995,086 | 11/1976 | Plunguian et al. | 264/338 X |

*Primary Examiner*—Sandra M. Person

[57] ABSTRACT

Shaped articles such as tiles and panels are produced from aqueous slurries of hydraulic cement, with or without aggregate, to which "super" water reducers have been admixed, by casting in a synthetic polymer mold with glossy, water-repellent surface, to yield castings with highly reflective, glassy surfaces. Color pigments may be added to the formulation to yield castings with reflective, glossy colored surfaces.

3 Claims, No Drawings

SHAPED ARTICLES OF HYDRAULIC CEMENT COMPOSITIONS HAVING A REFLECTIVE SURFACE

CROSS REFERENCE TO RELATED APPLICATION

This application is a division of application Ser. No. 649,895, filed Jan. 16, 1976, now U.S. Pat. No. 4,036,839, which was a continuation-in-part to application Ser. No. 591,095, filed June 27, 1975, now U.S. Pat. No. 3,995,086.

BACKGROUND OF THE INVENTION

A primary object of the invention is to provide shaped articles of cementitious material with at least one highly reflective, glassy surface or part of the surface, useful for decorative and protective purposes such as indoor and outdoor wall panelling, roofing tiles, curved objects and the like.

Another object of the present invention is to provide a novel method for the production of shaped articles of cementitious material having highly reflective glassy surfaces.

SUMMARY OF THE INVENTION

Our application Ser. No. 591,095 describes a process for forming shaped articles with highly reflective surfaces by casting calcium aluminate cement slurries in molds of glossy water repellent synthetic polymers. It has now been found that another method of producing such articles is by employing grey or white portland cement, and gypsum cement, as well as calcium aluminate cement, to which a small percentage of the so-called "super" water reducers had been admixed.

These water reducers have only recently become available. By admixing about 0.5% to 1.5% of these water reducers to portland cement, it is possible to produce practical pastes, mortars, and concrete with 10% to 25% less water, without decreasing the "slump" or the workability of the cement slurries. Examples of such water reducers are as follows:

"Mighty" (ICI U.S.). This consists of about 90% of a polymer of the sodium salt of naphthalene sulfonic acid partially condensed with formaldehyde, and about 10% sodium gluconate (U.S. Pat No. 3,686,133). "Melment L-10" (American Admixtures) is similar to "Mighty" except that a melamine ring is used instead of a naphthalene ring in the polymer component. Melment 1-10 is an aqueous solution.

"Lomar D" (Diamond-Shamrock) is identical to the 90% polymer component of "Mighty."

"FX-32" (Fox Industries) is a catalytic high early strength admixture for portland cement the addition of which will reduce the water content 15-25%.

When portland cement, with or without aggregate, or gypsum cement slurries, are cast in molds of naturally water-repellent synthetic polymers, such as polypropylene, polystyrene, or polyacrylate, the casting, after curing, assumes the shape of the mold. However, the surface which was in contact with the mold surface is either dull or semiglossy. This partial gloss when present, disappears after exposure to the air for about a day. However, with the admixture of about 0.25% to about 2.0%, based on the weight of the cement, of one of the water reducers to the formulation, a highly reflective, glassy surface is produced upon curing the cement, for the surface in contact with the mold during curing. The surface of the mold is reproduced exactly in the cured cement product. This glassy surface is now permanent. Such portland cement and calcium aluminate cement products may be exposed to the elements without change in reflectivity. The reflectivity of gypsum cement products is stable for indoor use, as long as the surface is not exposed to water.

It was found to be advantageous to use a small amount of retarder in the cement formulation, of the order of 0.01% to about 0.1% on the weight of the cement, such as glycerine, cane sugar, or ethylene glycol. Such addition aids in the release of the cured cement product from the plastic mold so as to yield a uniform surface and a cleaner mold suitable for re-use.

The cement products may be made more waterproof by the admixture of such additives as calcium stearate or high viscosity nondetergent petroleum oil, without affecting the reflectivity of the surface.

The cement slurries may be produced by dispersing or dissolving each component in turn in the water. A preferred procedure is to blend all the dry components and then mix this preblended material into the required amount of water. The latter procedure lends itself to bagging the product, requiring only the use of water for slurrying and casting or spraying into the plastic molds.

The glossy surfaces may be produced in any color by the addition of color pigments to the cement formulation. Such color pigments should be insoluble in water, chemically inactive, light fast, and of fine particle size. These pigments are generally the iron oxides for red, yellow, buff, brown, grey, and black; manganese oxide for black and brown; chromium oxide for green; and cobalt blue for blue. Titanium dioxide and other white pigments may be added to lighten the color of the darker components in some cements. Marble effects may be produced by partial blending of two or more variously colored slurries prior to casting.

The portland and calcium aluminate cement slurries may be used neat, or as a mortar with sand or other aggregates.

To save on the use of expensive color and/or water reducer, it may be desirable to use the formulated cement only for the surface layer. A layer of about 0.1 inch thick is sufficient to give the highly reflective glassy surface in any desired color. After applying the base coating of formulated cement slurry, by slush coating, spraying, or casting, and allowing it to set for a few minutes, it is backed with a layer of plain cementitious material. This backing may be of a lower density composition, such as by the use of a lightweight aggregte, or by foaming, to produce an overall lighter density, less thermally and acoustically conductive product. The backing may also be composed of dense mortar or concrete.

The invention will be further illustrated by the following examples, in which all parts are by weight.

DETAILED DESCRIPTION OF THE INVENTION

The formulations summarized in Table 1 were cast in polystyrene, polypropylene, and polyacrylic molds.

Example 1, without any water reducer additive, had a semi-glossy surface when removed from the mold after curing for three days. After exposure to the air over night, the surface had lost its gloss to become dull, and non-reflective.

The other examples, with the compositions as shown in Table 1, produced highly reflective surfaces after curing in the molds at room temperature for 2 to 5 days. The reflectivity of the surfaces did not change after exposure to the atmosphere.

Example 8, with its backing of foamed lightweight composition, was non-conductive to heat. This was shown by subjecting the back of the panel to the heat of a propane torch at about 1600° F for about 10 minutes until the cement was glowing red, while the glassy surface remained cool to the touch.

The presence of pozzolonic fly ash in Example 11 makes it possible to incorporate the inexpensive "E" type fiber glass for strength reinforcement. The chemical attack on the glass fiber by the high alkalinity of the cement is prevented by the fly ash. The presence of the fly ash did not affect the high gloss of the surface.

It should be appreciated that those skilled in the art could suggest various changes and modifications of the presently preferred embodiments of the invention after being apprised of the same. It is intended to encompass all such changes and modifications as fall within the scope and spirit of the appended claims.

Table 1.

| Example No. | \multicolumn{12}{c}{Examples of formulated cement compositions, in part by weight} |
|---|---|---|---|---|---|---|---|---|---|---|---|---|

| Example No. | 1 | 2 | 3 | 4 | 5 | 6 | 7 | 8[1] | 9 | 10 | 11[2] | 12 |
|---|---|---|---|---|---|---|---|---|---|---|---|---|
| Water | 44 | 40 | 75 | 75 | 75 | 75 | 75 | 40 | 42 | 42 | 43 | 44 |
| portland cement | 100 | 100 | 100 | 100 | 100 | 100 | 100 | 100 | 100 | 100 | 50 | — |
| gypsum | — | — | — | — | — | — | — | — | — | — | — | 100 |
| glycerine | — | 0.05 | .05 | 0.05 | 0.05 | 0.05 | 0.05 | 0.05 | 0.05 | 0.1 | 0.1 | 0.1 |
| $TiO_2$ | — | 1.5 | — | — | — | — | — | — | — | — | — | — |
| $CaCO_3$ | — | — | — | — | — | — | 6 | 0 | — | — | — | — |
| $Ca(OH)_2$ | — | — | — | — | — | — | — | — | — | 12.5 | 12.5 | 12.5 |
| fly ash | — | — | — | — | — | — | — | — | — | — | 42.5 | — |
| Ca stearate | — | — | — | — | — | — | — | — | 1 | — | — | 1 |
| SAE 60 oil | — | 3 | — | — | — | — | — | — | — | — | — | — |
| Mighty | — | — | 1 | — | — | — | — | — | — | — | — | — |
| FX-32 | — | 1 | — | 1.5 | — | — | — | — | — | — | — | — |
| Lomar D | — | — | — | — | 1.5 | — | 1.5 | 1.5 | 1 | 1 | 1 | 1 |
| Melment L-10 | — | — | — | — | — | 3 | — | — | — | — | — | — |
| red $Fe_2O_3$ | 3 | — | 3 | 3 | 3 | 3 | 1.5 | 1.5 | 1.5 | 1.5 | 3 | — |
| sand | 200 | 175 | 400 | 400 | 300 | 400 | 400 | 400 | 200 | 200 | 200 | — |

[1]Example 8 was backed with foamed composition of 50 portland cement, 100 sand, 25 water, 5 Ultrawet 30DS, and 10 polyvinyl acetate emulsion, in parts by weight. [2]Example 11 was strengthened by incorporating two layers of glass fiber scrim made from "E" glass. These glass fabrics were placed in the mold after part of the wet slurry had been distributed in the mold. The additional slurry was then added and leveled for curing.

We claim:

1. A shaped article with a reflective glossy surface, formed by casting or filling in a synthetic polymer mold with a glossy water-repellent surface, an aqueous cementitious slurry comprising in cured composition, all in parts by weight, 100 parts hydraulic cement selected from the group of portland cement, calcium aluminate cement, and gypsum cement; 10–400 parts aggregate; 0.25–2.0 parts, on a dry basis, of cement dispersing agents or cement water reducers selected from the group of polymers consisting of the alkali metal salts of melamine sulfonic acid partially condensed with formaldehyde, the alkali metal salt of naphthalene sulfonic acid partially condensed with formaldehyde, and 30–90 percent of the alkali metal salt of a high molecular weight condensation product of naphthalene sulfonic acid and the balance 70–10 percent being the alkali metal salt of gluconic acid; 0.01–0.1 parts of a cement curing retarder; 0–10 parts of color pigment; curing the casting and then removing the cured cementitious product from the plastic mold.

2. A shaped article with a reflective glossy surface according to claim 1 in which a relatively thin coating of about 100–250 mils thickness of said formulated cement is backed with conventional high density cementitious composition.

3. A shaped article with a reflective glossy surface according to claim 1 in which a relatively thin coating of about 100–250 mils thickness of said formulated cement is backed with a lightweight cementitious composition of decreased thermal conductivity and increased acoustical absorbency.

* * * * *